(12) United States Patent
Zorgui et al.

(10) Patent No.: US 12,501,444 B2
(45) Date of Patent: Dec. 16, 2025

(54) TECHNIQUES FOR LINKING PERIODIC RESOURCE GRANTS IN WIRELESS COMMUNICATIONS

(71) Applicant: QUALCOMM Incorporated, San Diego, CA (US)

(72) Inventors: Marwen Zorgui, San Diego, CA (US); Ahmed Attia Abotabl, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 534 days.

(21) Appl. No.: 18/053,345

(22) Filed: Nov. 7, 2022

(65) Prior Publication Data

US 2024/0155621 A1 May 9, 2024

(51) Int. Cl.
*H04W 72/23* (2023.01)
(52) U.S. Cl.
CPC .................................. *H04W 72/23* (2023.01)
(58) Field of Classification Search
None
See application file for complete search history.

(56) References Cited

U.S. PATENT DOCUMENTS

| | | | |
|---|---|---|---|
| 2022/0210824 A1* | 6/2022 | Ying | H04L 1/1864 |
| 2022/0369341 A1* | 11/2022 | Ying | H04W 72/1273 |
| 2022/0386363 A1* | 12/2022 | Ying | H04L 1/1896 |
| 2023/0156735 A1* | 5/2023 | Ying | H04L 1/1614 |
| | | | 370/329 |
| 2024/0073891 A1* | 2/2024 | Deghel | H04L 1/1874 |

* cited by examiner

*Primary Examiner* — Clemence S Han
(74) *Attorney, Agent, or Firm* — ArentFox Schiff, LLP

(57) ABSTRACT

Aspects described herein relate to receiving, from a network node, a configuration indicating one or more parameters for linking periodic resource grant resources for communication in a wireless network, receiving a first periodic resource grant indicating first resources for communicating in the wireless network, receiving a second periodic resource grant indicating second resources, different from the first resources, for communicating in the wireless network, and transmitting or receiving, based on the one or more parameters indicating to link the first resources and the second resources, same data over the first resources and the second resources. Other aspects relate to transmitting the configuration and the periodic resource grants.

29 Claims, 8 Drawing Sheets

TECHNIQUES FOR LINKING PERIODIC RESOURCE GRANTS IN WIRELESS COMMUNICATIONS

FIELD OF THE DISCLOSURE

Aspects of the present disclosure relate generally to wireless communication systems, and more particularly, to techniques for utilizing configured grants and/or semi-persistent scheduling grants.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a processor, memory coupled with the processor, and instructions stored in the memory. The instructions are operable, when executed by the processor, to cause the apparatus to receive, from a network node, a configuration indicating one or more parameters for linking periodic resource grant resources for communication in a wireless network, receive a first periodic resource grant indicating first resources for communicating in the wireless network, receive a second periodic resource grant indicating second resources, different from the first resources, for communicating in the wireless network, and transmit or receive, based on the one or more parameters indicating to link the first resources and the second resources, same data over the first resources and the second resources.

In another aspect, an apparatus for wireless communication is provided that includes a processor, memory coupled with the processor, and instructions stored in the memory. The instructions are operable, when executed by the processor, to cause the apparatus to transmit, for a user equipment (UE), a configuration indicating one or more parameters for linking periodic resource grant resources for communication in a wireless network, transmit a first periodic resource grant indicating first resources for communicating in the wireless network, transmit a second periodic resource grant indicating second resources, different from the first resources, for communicating in the wireless network, and transmit or receive, based on the one or more parameters indicating to link the first resources and the second resources, same data over the first resources and the second resources.

In another aspect, a method for wireless communication at a UE is provided that includes receiving, from a network node, a configuration indicating one or more parameters for linking periodic resource grant resources for communication in a wireless network, receiving a first periodic resource grant indicating first resources for communicating in the wireless network, receiving a second periodic resource grant indicating second resources, different from the first resources, for communicating in the wireless network, and transmitting or receiving, based on the one or more parameters indicating to link the first resources and the second resources, same data over the first resources and the second resources.

In another aspect, a method for wireless communication at a network node is provided that includes transmitting, for a UE, a configuration indicating one or more parameters for linking periodic resource grant resources for communication in a wireless network, transmitting a first periodic resource grant indicating first resources for communicating in the wireless network, transmitting a second periodic resource grant indicating second resources, different from the first resources, for communicating in the wireless network, and transmitting or receiving, based on the one or more parameters indicating to link the first resources and the second resources, same data over the first resources and the second resources.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
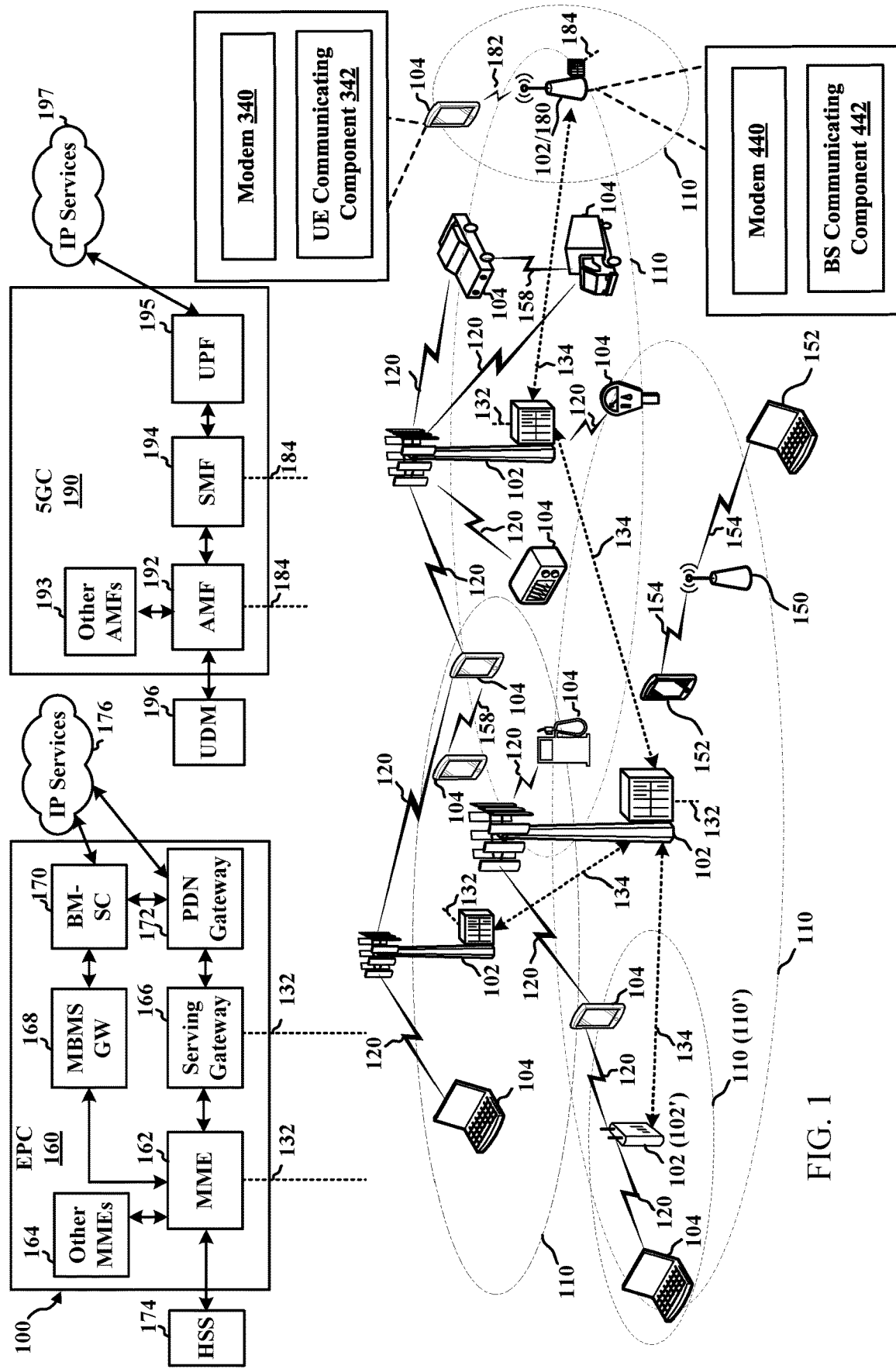
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to linking periodic resource grants to improve reliability in wireless communications. In some wireless communication technologies, such as fifth generation (5G) new radio (NR), periodic resource grants can include configured grants (CGs) for uplink communications where a network node can configure user equipment (UE) with resources for periodic use. For example, CGs can be at least partially configured using radio resource control (RRC) signaling to indicate the time and frequency resources over which the UE can transmit uplink communications (and/or periodicity, repetitions, or other configurations related to the resources). In an example, CGs can be one of two types: a first type that does not use additional activation via downlink control information (DCI) or a second type that does use additional activation via DCI. In 5G NR, for example, a UE can be configured with up to 12 uplink (UL) CGs. In another example, the periodic resource grants can include semi-persistent scheduling (SPS) grants for downlink communications where the network node can configure the UE with resources for periodically receiving downlink communications. Moreover, periodic resource grants, as described herein, may or may not have a regular period such that the resources are evenly spaced in time. One type of periodic resource grant may be configured according to a regular period. Another type of periodic resource grant may be configured according to one or more irregular periods, multiple different periods, and/or may include a specification of individual resources that may or may not be evenly spaced in a time domain.

In an example, resources of periodic resource grants can provide an opportunity for allowing repetition in communications, which can improve reliability of the communications. For example, parameters can be defined for indicating or otherwise determining to use (e.g., link) certain resources of periodic resource grants for repetitions, such as a time period between the resources, a similarity or relation in frequency size among the resources, and/or the like. Using multiple resources for multiple repetitions of wireless communications can provide additional reliability for the wireless communications, as the repetitions can be combined to increase resource utilization for the wireless communications. This can accordingly improve user experience with using the network and/or the UE, etc.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for linking periodic grant resources for communicating repetitions, in accordance with aspects described herein. In addition, some nodes may have a modem 440 and BS communicating component 442 for configuring a UE to link periodic grant resources for communicating repetitions, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, UE communicating component 342 can receive multiple periodic grant resources, such as multiple CGs or multiple SPS grants. UE communicating component 342 can link resources of multiple periodic resource grants for use in communicating repetitions to improve reliability of wireless communications. For example, UE communicating component 342 can receive a configuration indicating which resources or corresponding periodic resource grants to link. In another example, UE communicating component 342 can select which resources to link based on properties thereof, such as a frequency domain resource allocation (FDRA), time domain resource allocation (TDRA), modulation and coding scheme (MCS), etc. BS communicating component 442 can configure the multiple periodic grant resources for the UE 104. In an example, BS communicating component 442 can also configure linking between resources of the periodic resource grants or can otherwise similarly select which resources to link based on properties thereof, such that UE 104 and base station 102 can know and use the same resources for transmitting or receiving and processing the repetitions.

Figure 2:
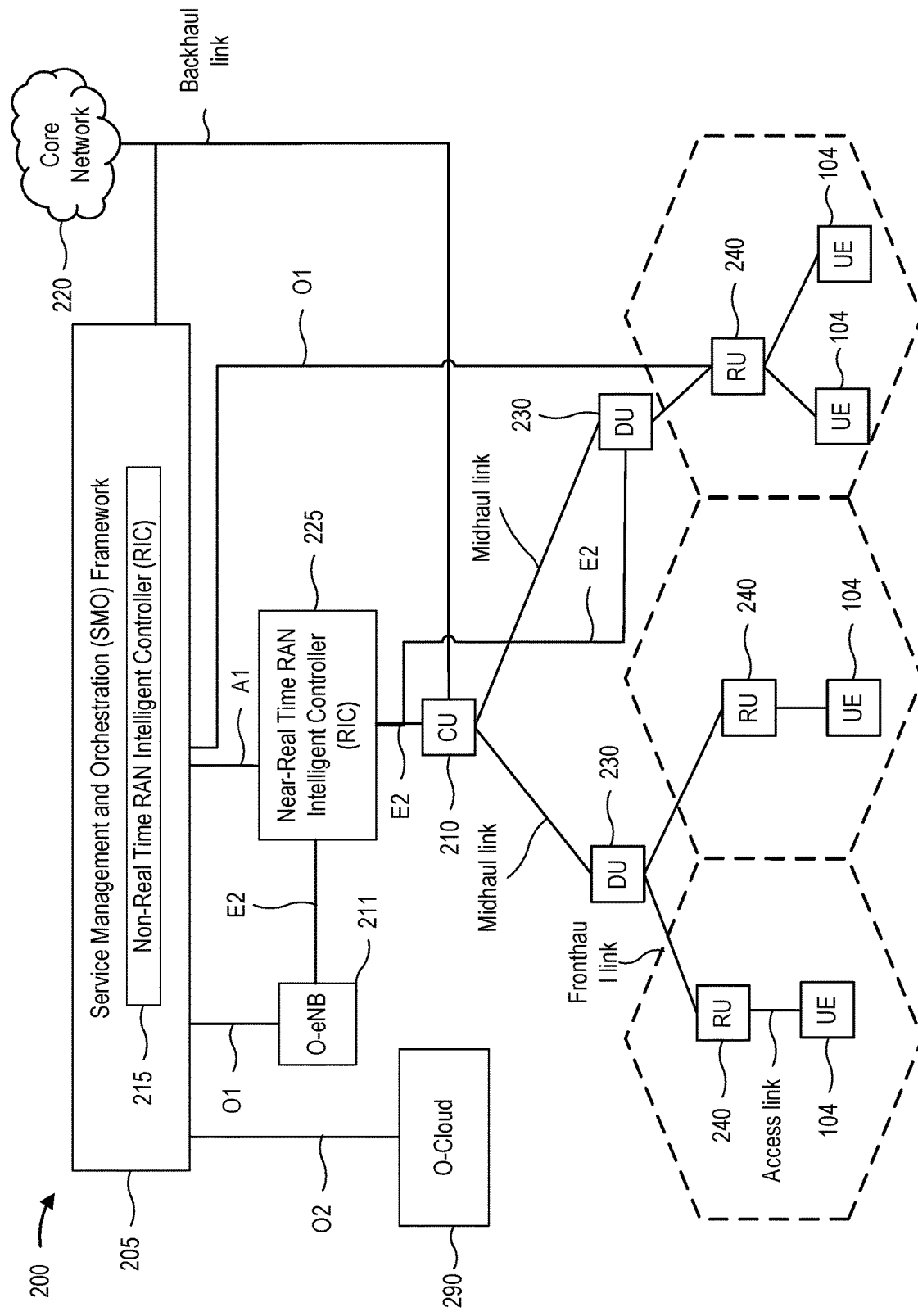
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In an example, BS communicating component 442, as described herein, can be at least partially implemented within a CU 210, and can transmit periodic resource grants, linking configuration information, etc. to UEs via one or more DUs 230, and/or the like. In another example, BS communicating component 442, as described herein, can be at least partially implemented within a DU 230, and can transmit periodic resource grants, linking configuration information, etc. to UEs via one or more RUs 240, and/or the like.

Figure 3:
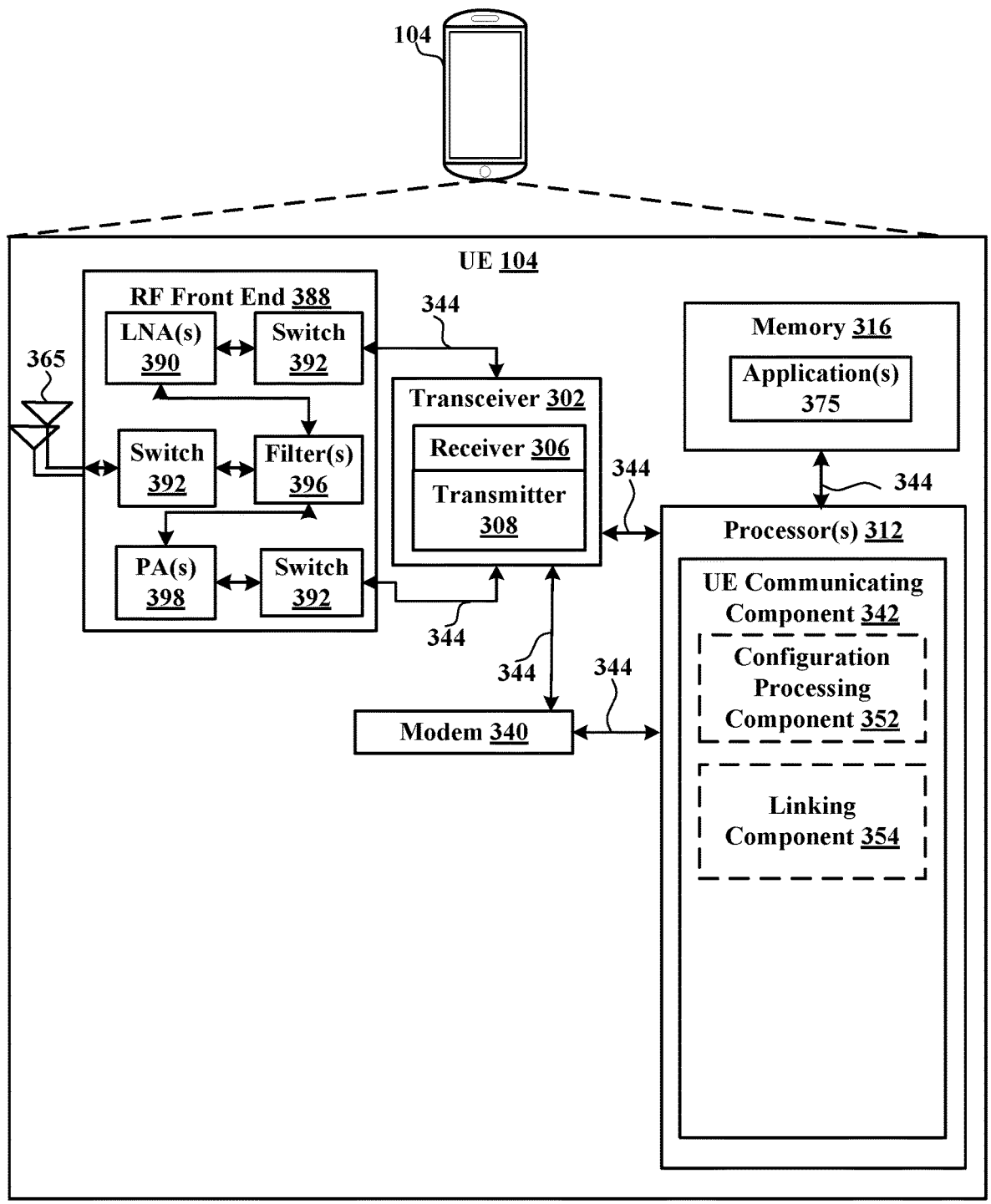
FIG. 3 is a block diagram illustrating an example of a user equipment (UE), in accordance with various aspects of the present disclosure.
Figure 4:
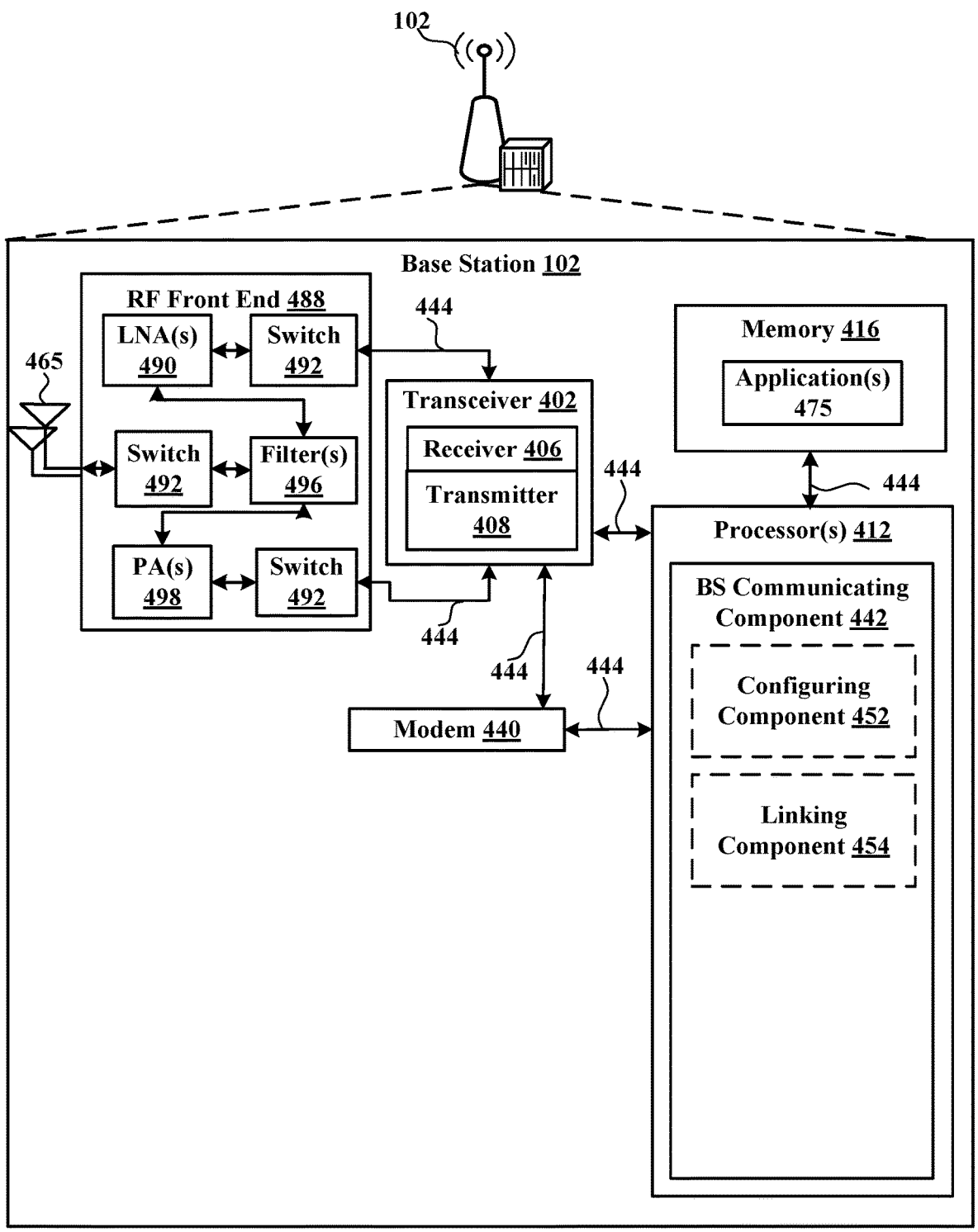
FIG. 4 is a block diagram illustrating an example of a base station, in accordance with various aspects of the present disclosure.
Figure 5:
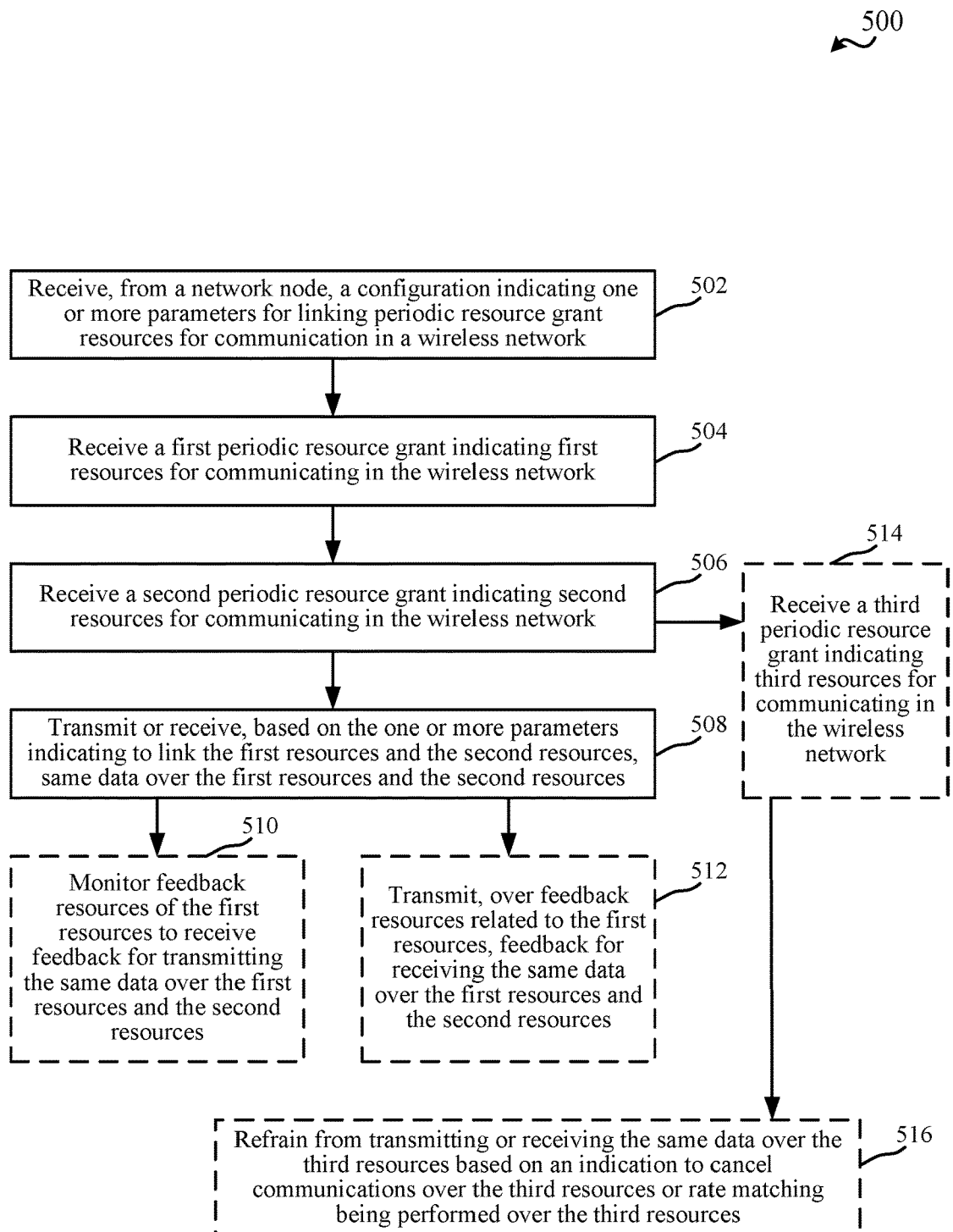
FIG. 5 is a flow chart illustrating an example of a method for linking resources from multiple periodic resource grants for repetition in communications, in accordance with aspects described herein.
Figure 6:
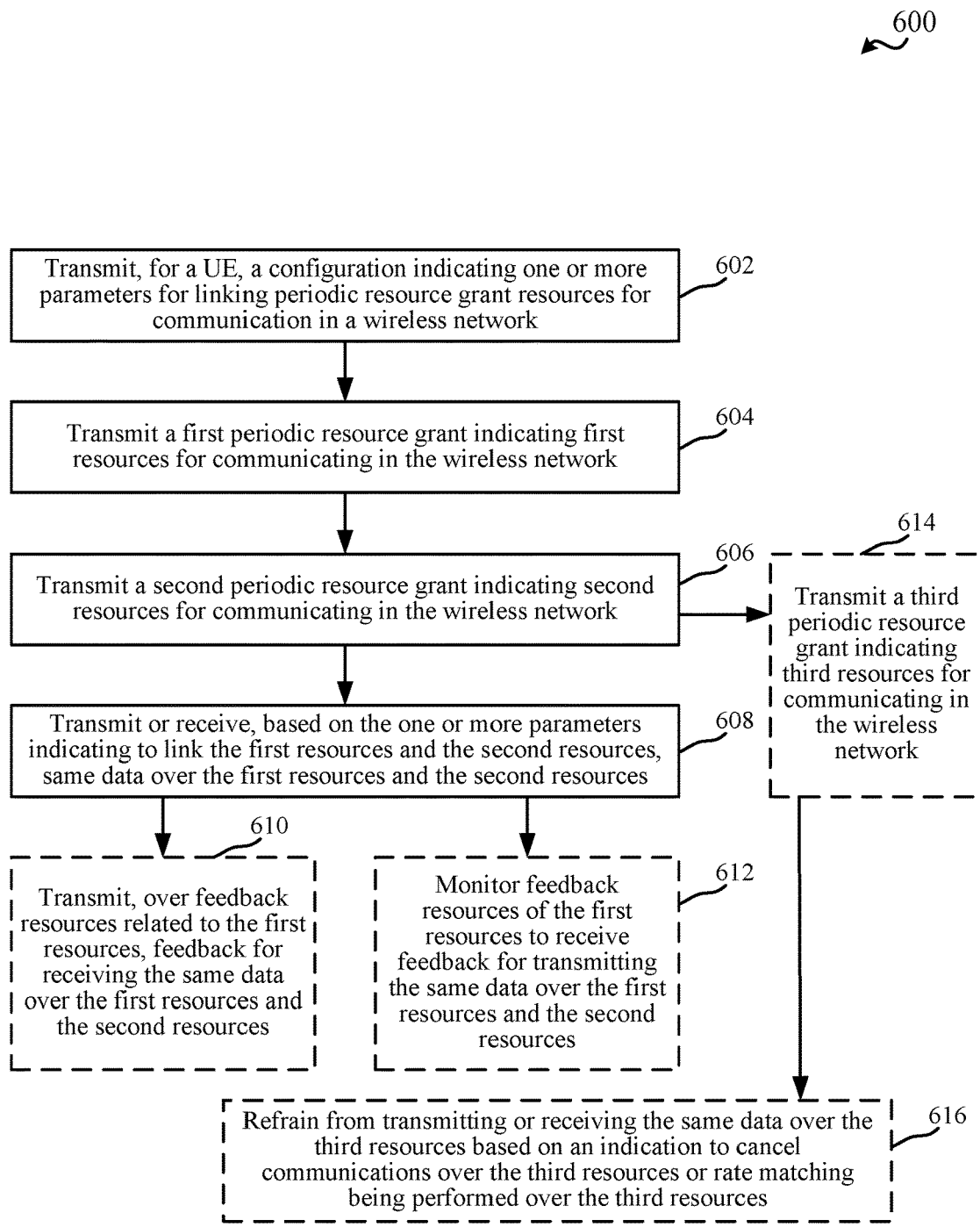
FIG. 6 is a flow chart illustrating an example of a method for configuring a device to link resources from multiple periodic resource grants for repetition in communications, in accordance with aspects described herein.

Turning now to FIGS. 3-8, aspects are depicted with reference to one or more components and one or more methods that may perform the actions or operations described herein, where aspects in dashed line may be optional. Although the operations described below in FIGS. 5 and 6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or UE communicating component 342 for linking periodic grant resources for communicating repetitions, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory 316 may be configured to store data used herein and/or local versions of applications 375 or UE communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include an configuration processing component 352 for receiving and/or processing a configuration indicating multiple periodic resource grants or associated resources, and/or a linking component 354 for linking resources from multiple periodic resource grants for communicating repetitions, in accordance with aspects described herein.

In an aspect, the processor(s) 312 may correspond to one or more of the processors described in connection with the UE in FIG. 8. Similarly, the memory 316 may correspond to the memory described in connection with the UE in FIG. 8.

Referring to FIG. 4, one example of an implementation of base station 102 (e.g., a base station 102 and/or gNB 180, as described above) may include a variety of components, some of which have already been described above, but including components such as one or more processors 412 and memory 416 and transceiver 402 in communication via one or more buses 444, which may operate in conjunction with modem 440 and BS communicating component 442 for configuring a UE to link periodic grant resources for communicating repetitions, in accordance with aspects described herein.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include a configuring component 452 for generating and/or transmitting a configuration indicating multiple periodic resource grants or associated resources, and/or a linking component 454 for linking resources from multiple periodic resource grants for communicating repetitions, in accordance with aspects described herein.

In an aspect, the processor(s) 412 may correspond to one or more of the processors described in connection with the base station in FIG. 8. Similarly, the memory 416 may correspond to the memory described in connection with the base station in FIG. 8.

FIG. 5 illustrates a flow chart of an example of a method 500 for linking resources from multiple periodic resource grants for repetition in communications, in accordance with aspects described herein. FIG. 6 illustrates a flow chart of an example of a method 600 for configuring a device to link resources from multiple periodic resource grants for repetition in communications, in accordance with aspects described herein. In an example, a UE 104 can perform the functions described in method 500 using one or more of the components described in FIGS. 1 and 3. In an example, a network node (e.g., a base station 102 or gNB 180, a monolithic base station or gNB, a portion of a disaggregated base station or gNB, etc.) can perform the functions described in method 600 using one or more of the components described in FIGS. 1 and 4. Methods 500 and 600 are described in conjunction with one another for ease of explanation; however, the methods 500 and 600 are not required to be performed together and indeed can be performed independently using separate devices.

In method 600, at Block 602, a configuration indicating one or more parameters for linking periodic resource grant resources for communication in a wireless network can be transmitted for a UE. In an aspect, linking component 454, e.g., in conjunction with processor(s) 412, memory 416, transceiver 402, BS communicating component 442, etc., can generate and/or transmit, for the UE (e.g., UE 104), the configuration indicating the one or more parameters for linking periodic resource grant resources for communication in the wireless network. For example, linking component 454 can transmit the configuration in RRC signaling, MAC-CE, DCI, etc. In an example, the configuration can include an indication of periodic resource grant identifiers to be linked (e.g., a UL CG identifier, a SPS grant identifier, etc.).

In another example, the configuration can include one or more parameters and/or associated rules for determining linking between periodic resource grants, such as a period of time between resource occasions of different periodic resource grants, where resource occasions occurring within the period of time can be linked. For example, the configuration may indicate the period of time as a number of symbols (e.g., orthogonal frequency division multiplexing (OFDM) symbols, single carrier-frequency division multiplexing (SC-FDM) symbols, etc.) such that resource occasions occurring within the number of symbols from one another can be linked. Moreover, as described above and further herein, the configuration can include multiple configurations, such as a RRC signaled configuration to indicate linking identifiers, rules, etc., and a MAC-CE or DCI to activate or deactivate linking (e.g., for any linking or specifying which linking(s) to activate/deactivate, etc.).

In method 500, at Block 502, a configuration indicating one or more parameters for linking periodic resource grant resources for communication in a wireless network can be received from a network node. In an aspect, linking component 354, e.g., in conjunction with processor(s) 312, memory 316, transceiver 302, UE communicating component 342, etc., can receive, from the network node, the configuration indicating one or more parameters for linking periodic resource grant resources for communication in the wireless network. For example, linking component 354 can receive one or more configurations over RRC signaling, MAC-CE, DCI, etc., as described, and may process the one or more configurations to obtain a linking between resources of multiple periodic resource grants.

In method 600, at Block 604, a first periodic resource grant indicating first resources for communicating in the wireless network can be transmitted. In an aspect, configuring component 452, e.g., in conjunction with processor(s) 412, memory 416, transceiver 402, BS communicating component 442, etc., can generate and/or transmit (e.g., for UE 104) the first periodic resource grant indicating the first resources for communicating in the wireless network. For example, configuring component 452 can transmit the first periodic resource grant as a UL CG transmitted over RRC signaling to indicate periodic resources over which the UE 104 can transmit UL communications, a MAC-CE or DCI to activate the periodic resources, etc. In another example, configuring component 452 can transmit the first periodic resource grant as a SPS grant transmitted over RRC signaling to indicate periodic resources over which the UE 104 can receive DL communications, a MAC-CE or DCI to activate the periodic resources, etc.

In method 600, at Block 606, a second periodic resource grant indicating second resources for communicating in the wireless network can be transmitted. In an aspect, configuring component 452, e.g., in conjunction with processor(s) 412, memory 416, transceiver 402, BS communicating component 442, etc., can generate and/or transmit (e.g., for UE 104) the second periodic resource grant indicating the second resources for communicating in the wireless network. For example, configuring component 452 can transmit the second periodic resource grant as a UL CG transmitted over RRC signaling to indicate periodic resources over which the UE 104 can transmit UL communications, a MAC-CE or DCI to activate the periodic resources, etc. In another example, configuring component 452 can transmit the second periodic resource grant as a SPS grant transmitted over RRC signaling to indicate periodic resources over which the UE 104 can receive DL communications, a MAC-CE or DCI to activate the periodic resources, etc.

In method 500, at Block 504, a first periodic resource grant indicating first resources for communicating in the wireless network can be received. In an aspect, configuration processing component 352, e.g., in conjunction with processor(s) 312, memory 316, transceiver 302, UE communicating component 342, etc., can receive (e.g., from the network node) the first periodic resource grant indicating the first resources for communicating in the wireless network. For example, configuration processing component 352 can receive the first periodic resource grant as a UL CG received over RRC signaling to indicate periodic resources over which the UE 104 can transmit UL communications, a MAC-CE or DCI to activate the periodic resources, etc. In another example, configuration processing component 352 can receive the first periodic resource grant as a SPS grant received over RRC signaling to indicate periodic resources over which the UE 104 can receive DL communications, a MAC-CE or DCI to activate the periodic resources, etc.

In method 500, at Block 506, a second periodic resource grant indicating second resources for communicating in the wireless network can be received. In an aspect, configuration processing component 352, e.g., in conjunction with processor(s) 312, memory 316, transceiver 302, UE communicating component 342, etc., can receive (e.g., from the network node) the second periodic resource grant indicating the second resources for communicating in the wireless network. For example, configuration processing component 352 can receive the second periodic resource grant as a UL CG received over RRC signaling to indicate periodic resources over which the UE 104 can transmit UL communications, a MAC-CE or DCI to activate the periodic resources, etc. In another example, configuration processing component 352 can receive the second periodic resource grant as a SPS grant received over RRC signaling to indicate periodic resources over which the UE 104 can receive DL communications, a MAC-CE or DCI to activate the periodic resources, etc.

In an example, the first periodic resource grant and/or the second periodic resource grant can include an identifier of the periodic resource grant, and the configuration described above can indicate identifiers of periodic resource grants to be linked for communicating repetitions (e.g., transmitting repetitions or receiving repetitions of wireless communications). In another example, the configuration described above can indicate parameters for determining which periodic resource grants can have linked resource occasions, such as a threshold time period that can occur between the resource occasions (e.g., a threshold number of symbols between the resource occasions). For example, one periodic resource grant can be considered as a source periodic resource grant for linking, such that resource occasions of other periodic resource grants can be linked with the source periodic resource grant and used for communicating the same data that is to be communicated using the source periodic resource grant.

For example, the configuration (e.g., as transmitted at Block 602 or received at Block 502) can include the UL CGs identifiers which happen between a source UL CG and linked UL CGs. The source UL CG can be defined such that its data is transmitted/repeated across the other linked UL CGs. In an example, the linkage can happen for more than two UL CGs. In one example, the configuration can specify the linked instances (linked instances transmit the same data/transport block (TB))—e.g., the configuration can include the specific instances to be linked from each UL CG. In an example, the configuration can include an RRC configuration, which can be determined by the UE based on some configured rules. For example, for the given specified IDs of the UL CGs, a UE can link all occasions such that the start symbol of the TDRA of the linked occasions are within at most X number of symbols within the same slot. For example, if X=3, UL CG1 (e.g., the source CG) occasion can start at symbol 0, UL CG2 occasion can start at symbol 1 (e.g., relative to the start symbol 0 of the source CG), UL CG3 occasion can start at symbol 2, and UL CG4 occasion can start at symbol 5, then the UE can autonomously link UL CG1, UL CG2, and UL CG3 based on the start symbols for UL CG2 and UL CG3 being within X=3 symbols of the start symbol for UL CG1. As described, for example, the linkage application can be always on once configured, or activated/deactivated by DCI or MAC-CE, etc., as described. For the non-linked occasions, the UE can transmit the data as intended per the corresponding UL CGs configuration. In addition, as described, the UE 104 and/or network node can communicate similar configurations, grant information, etc. and/or can perform linking for SPS resource grants using similar concepts as those described above for UL CGs.

In some examples, the resources scheduled by the first and second periodic resource grants may have a same or similar TDRA (e.g., a same TDRA size, such as number of symbols in the resource allocation), periodicity (e.g., a time period between resources, such as a number of symbols), MCS, FDRA (e.g., same FDRA size, such as a number of resource blocks (RBs) or configuration of RBs within one or more symbols, though the RBs or associated carrier frequencies may be with a certain frequency gap), etc. To improve the reliability of the UL UE transmission for UL CG (or DL network node transmission for SPS grants), the UE can be configured to transmit or receive the same data over resources of both periodic resource grants (e.g., over resources of multiple UL CGs or resources of multiple SPS grants). This can increase the reliability of the UL CG transmissions, as the network node can monitor for multiple different transmissions for the same data (e.g., providing a diversity gain), and/or can increase reliability of DL SPS transmissions, as the UE can similarly monitor for multiple different transmissions for the same data. Using resources for repetitions in this regard can improve performance over reducing the MCS of one configuration, as it can provide time and frequency diversity. For UL CGs, for example, linking resources in this regard can provide an opportunistic multi-UL CGs linkage for improved reliability. The linkage is because the data from a first UL CG occasion can be transmitted on another UL CG occasion, as described above, and is opportunistic because it can be done in certain occasions when supported. In general, UL CGs can be different in terms of periodicity, resource allocations, etc. Using two UL CGs occasions for the same data transmissions may not be possible for all possible occasions, in some examples (e.g., the 2 UL CGs TDRA occasions are not close in time). In aspects described herein, opportunistic multi-UL CGs linkage can be configured for improved reliability, and different scenarios for enabling opportunistic multi-UL CGs linkage can be addressed. In addition, the concepts described herein can be similar used for SPS framework.

In method 500, at Block 508, same data can be transmitted or received over the first resources and the second resources based on the one or more parameters indicating to link the first resources and the second resources. In an aspect, UE communicating component 342, e.g., in conjunction with processor(s) 312, memory 316, transceiver 302, etc., can transmit or receive, based on the one or more parameters indicating to link the first resources and the second resources, same data over the first resources and the second resources. Similarly, in method 600, at Block 608, same data can be transmitted or received over the first resources and the second resources based on the one or more parameters indicating to link the first resources and the second resources. In an aspect, BS communicating component 442, e.g., in conjunction with processor(s) 412, memory 416, transceiver 402, etc., can transmit or receive, based on the one or more parameters indicating to link the first resources and the second resources, same data over the first resources and the second resources. For example, UE communicating component 342 can transmit the same data packet over the different UL CG resources that are linked, and/or BS communicating component 442 can receive the same data packet over the different UL CG resources that are linked. For example, BS communicating component 442 can combine the received signals in processing the data to achieve improved performance based at least on a diversity gain. In another examples, BS communicating component 442 can transmit the same data packet over the different DL SPS resources that are linked, and/or UE communicating component 342 can receive the same data packet over the different DL SPS resources that are linked. For example, UE communicating component 342 can combine the received signals in processing the data to achieve improved performance based at least on a diversity gain.

In another example, different periodic resource grants can have different TDRAs, FDRA, MCSs, etc. Configuring component 452 can generate a configuration, and/or configuration processing component 352 can process a configuration, indicating linking between resources of periodic resource grants that may have different TDRA (e.g., a different number of symbols), FDRA (e.g., a different number of RBs), MCS, etc. In one example, where the periodic resource grants have different TDRA, FDRA, MCS, etc., the UE or network node may ensure the source data for the first periodic resource grant can fit within the resources allocated by the second periodic resource grant (and/or additional periodic resource grants that are linked to the first periodic resource grant). For example, the UE or network node may ensure that the resources of the linked periodic resource grants are at least as large as (e.g., at least a size of, or greater than or equal to) the resources of the source (e.g., first) periodic resource grant (e.g., the source has 10 symbols, and the linked occasion has 12 symbols). For example, the UE or network node can ensure that the resources of the linked periodic resource grants have at least a number of RBs as resources of the source periodic resource grant. This can ensure that the data to be transmitted in the resources of the source periodic resource grant can be transmitted within the linked periodic resource grant(s).

In one specific non-limiting example, for UL CGs, a rule can be specified, or otherwise implemented within a UE, configured for the UE (e.g., by the network node), etc., as to how the UE maps the source data to the resources of the linked periodic resource grant occasions. One example rule may be that for each linked UL CG occasion, the UE maps data to be repeated from the source UL CG occasion across frequency followed by time in the resources for the linked UL CG occasion(s): that is the UE can start allocating the data to frequency resources (lowest RB to highest RB) of the first OFDM symbol, then moves to the next OFDM symbol and so on. Another example rule may be that for each linked UL CG occasion, the UE maps data to be repeated from the source UL CG occasion across time followed by frequency for the linked UL CG occasion(s): that is the UE starts allocating the data to the first RB of each OFDM symbol, then moves the next RB of all OFDM symbols and so on. In an example, the one or more rules may be similarly applied by a network node mapping data for a source SPS resource grant to one or more linked SPS resource grants.

In another example, there may be no rules or restrictions in terms of TDRA, FDRA, MCS, etc. between the linked periodic resources grants. For example, if two or more periodic resource grants are linked, one of them can be configured to be the source periodic resources grant. For a given data (or associated TB) of a source periodic resource grant, for example, if the configurations of one or more of the linked periodic resource grants allow for transmission of the same data/TB then the UE (or network node) can transmit the same data/TB in the one or more linked periodic resource grant(s). If the configurations of one or more of the linked periodic resource grant(s) do not allow for transmission of the same data/TB (e.g., the resources of the one or more linked periodic resource grants are not sufficient to transmit the whole data/TB), then the UE (or network node) can transmit parity bits of the data or associated codeword in the linked periodic resource grant occasions that cannot fit the source data/TB.

Thus, in some examples, transmitting or receiving the same data over the first resources and second resources, e.g., as described in conjunction with Blocks 508 and 608 of methods 500 and 600, can be based on such rules and/or may include transmitting or receiving parity bits where the same data may not fit in the second resources (e.g., the resources of one or more linked periodic resource grants).

In addition, in an example, resource occasions for a given UL CG can be associated with repetition factor for the given UL CG, such that a UE can configure (or can be configured with) a repetition factor used to indicate a repetition in one or more resource occasions of a given UL CG. In the above described examples, repetition factors of the resource occasions for a given UL CG (or more generally for a periodic resource grant) can be separately configured from a repetition value configured for resource occasions for the linked periodic resource grants. For example, each of the first resources and second resources that are linked, as described above, can have a repetition value that is regardless of the periodic resource grant to which the resources belong. The reason behind this is that the periodicity of the linked periodic resource grants can be different, and to obtain all the linked transmissions with their repetition in a timely manner, appropriate repetition values may be considered. In one specific non-limiting example, a UE or network node transmitting the data can set the repetition value for all linked resource occasions to the same value (e.g., 1). This can be justified by the fact that redundancy benefit/gain can be enabled by transmitting the same data across resources of different periodic resource grants. The repetition factor of the source/linked periodic resource grant(s) may not apply to the linked occasions, which are configured with a separate repetition value (e.g., 1). In another example, for increased reliability, the UE or network node transmitting the data across the resources (e.g., the linked resource occasions) of the source and linked periodic resource grants can set different redundancy versions across the resources. The network node or UE receiving the repetitions can use the redundancy version to detect repetitions, determine whether sequential repetitions are received, whether any repetitions are missed, etc., to improve decoding and reliability of receiving the communications.

Figure 7:
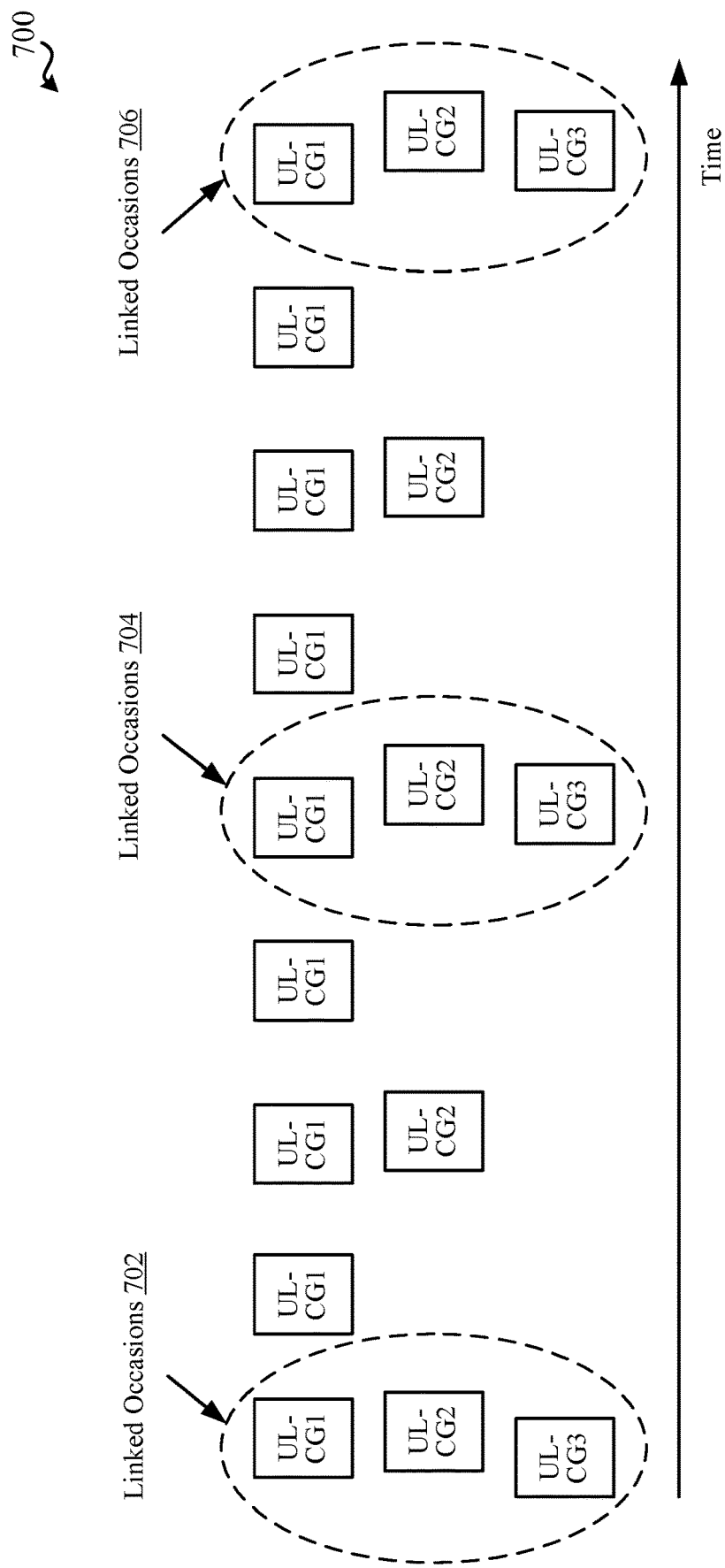
FIG. 7 illustrates an example of a timeline with linked resource occasions of different periodic resource grants, in accordance with aspects described herein.

FIG. 7 illustrates an example of a timeline 700 with linked resource occasions of different periodic resource grants. Timeline 700 includes various UL CGs, which are shown in time along a horizontal axis and can be represented in frequency across the vertical axis. In timeline 700, UL-CG1, UL-CG2, and UL-CG3 have different periodicities and may be offset in time. In timeline 700, UL-CG1 can be the source periodic resource grant (e.g., the first periodic resource grant described herein), and UL-CG2 and/or UL-CG3 can be considered for linking resource occasions with UL-CG1. For example, as described, a UE 104 can be configured with explicit linking information to link some of the occasions, or can determine to link some occasions based on specific parameters, such as a time difference between the UL-CGs, a same FDRA or MCS used for the UL-CGs, etc. In an example, the UE 104 can create linked occasions at 702, 704, 706, where resources for UL-CG1, UL-CG2, and UL-CG3 in a given linked occasion can each be used to transmit and/or receive the same communications (e.g., the same data, associated TB, etc.) to provide data repetition and associated frequency diversity, improving reliability for the communications. As described, similar functionality can be provided for SPS resource grants, and a network node can link certain resource occasions for different SPS resource grants to provide diversity in DL SPS data transmissions.

Referring back to FIGS. 5 and 6, in method 500, optionally at Block 510, feedback resources of the first resources can be monitored to receive feedback for transmitting the same data over the first resources or the second resources. In an aspect, UE communicating component 342, e.g., in conjunction with processor(s) 312, memory 316, transceiver 302, etc., can monitor feedback resources of the first resources to receive feedback for transmitting the same data over the first resources and the second resources. For example, if hybrid automatic repeat/request (HARQ)-acknowledgement (ACK) feedback is configured for the UL CGs, the UE 104 can monitor retransmission request of only the first (e.g., source) UL CG occasion and may not need to monitor retransmission requests of the second (e.g., linked) UL CGs occasions.

Similarly, in method 600, optionally at Block 610, feedback for receiving the same data over the first resources and the second resources can be transmitted over feedback resources related to the first resources. In an aspect, BS communicating component 442, e.g., in conjunction with processor(s) 412, memory 416, transceiver 402, etc., can transmit, over the feedback resources related to the first resources, the feedback for receiving the same data over the first resources and the second resources. In this regard, for example, for the second (e.g., linked) UL CG occasions, the network node can transmit HARQ/ACK feedback or retransmission request of only the source UL CG occasion.

In another example, similarly for DL SPS resource grants, in method 600, optionally at Block 612, feedback resources of the first resources can be monitored to receive feedback for transmitting the same data over the first resources or the second resources. In an aspect, BS communicating component 442, e.g., in conjunction with processor(s) 412, memory 416, transceiver 402, etc., can monitor feedback resources of the first resources to receive feedback for transmitting the same data over the first resources and the second resources. In a similar example, in method 500, optionally at Block 512, feedback for receiving the same data over the first resources and the second resources can be transmitted over feedback resources related to the first resources. In an aspect, UE communicating component 342, e.g., in conjunction with processor(s) 312, memory 316, transceiver 302, etc., can transmit, over the feedback resources related to the first resources, the feedback for receiving the same data over the first resources and the second resources.

In yet another example, if the UE (and/or network node) could not transmit data on resources of one of the linked UL CGs (e.g., for reasons such as UL cancellation indication from the network, rate matching resources, etc.), the UE (and/or network node) may still transmit on resources of the remaining linked CGs. For example, in method 500, optionally at Block 514, a third periodic resource grant indicating third resources for communicating in the wireless network can be received. In an aspect, configuration processing component 352, e.g., in conjunction with processor(s) 312, memory 316, transceiver 302, UE communicating component 342, etc., can receive the third periodic resource grant indicating third resources for communicating in the wireless network. In an example, linking component 354 can determine to link third resources of the third periodic resource grant with the first and second resources for communicating repetitions, but UE communicating component 342 can determine that the communications cannot occur of the third resources (e.g., due to UL cancellation indication from the network, rate matching resources, etc.). In this example, in method 500, optionally at Block 516, transmitting or receiving the same data over the third resources can be refrained from based on an indication to cancel communications over the third resources or rate matching being performed on the third resources. In an aspect, UE communicating component 342, e.g., in conjunction with processor(s) 312, memory 316, transceiver 302, etc., can refrain from transmitting or receiving the same data over the third resources based on the indication to cancel communications over the third resources or rate matching being performed over the third resources.

Similarly, for example, in method 600, optionally at Block 614, a third periodic resource grant indicating third resources for communicating in the wireless network can be transmitted. In an aspect, configuring component 452, e.g., in conjunction with processor(s) 412, memory 416, transceiver 402, BS communicating component 442, etc., can transmit the third periodic resource grant indicating third resources for communicating in the wireless network. In an example, linking component 354 can determine to link third resources of the third periodic resource grant with the first and second resources for communicating repetitions, but BS communicating component 442 can determine that the communications cannot occur of the third resources (e.g., due to UL cancellation indication from the network, rate matching resources, etc.). In this example, in method 600, optionally at Block 616, transmitting or receiving the same data over the third resources can be refrained from based on an indication to cancel communications over the third resources or rate matching being performed on the third resources. In an aspect, BS communicating component 442, e.g., in conjunction with processor(s) 412, memory 416, transceiver 402, etc., can refrain from transmitting or receiving the same data over the third resources based on the indication to cancel communications over the third resources or rate matching being performed over the third resources.

Figure 8:
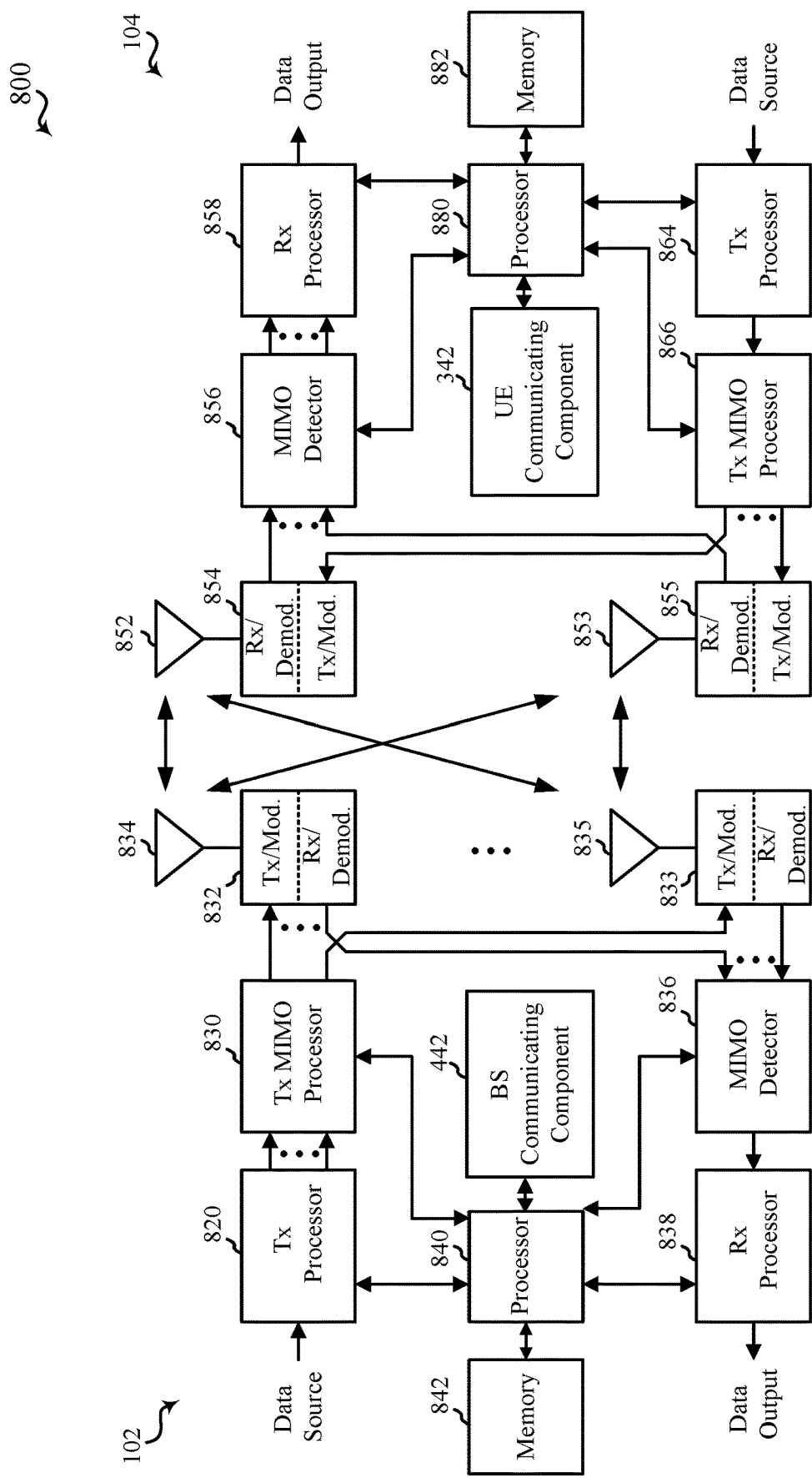
FIG. 8 is a block diagram illustrating an example of a multiple-input multiple-output (MIMO) communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1 and 3. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a UE communicating component 342 (see e.g., FIGS. 1 and 3).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for single carrier-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 800.

The following aspects are illustrative only and aspects thereof may be combined with aspects of other embodiments or teaching described herein, without limitation.

Aspect 1 is a method for wireless communication at a UE including receiving, from a network node, a configuration indicating one or more parameters for linking periodic resource grant resources for communication in a wireless network, receiving a first periodic resource grant indicating first resources for communicating in the wireless network, receiving a second periodic resource grant indicating second resources, different from the first resources, for communicating in the wireless network, and transmitting or receiving, based on the one or more parameters indicating to link the first resources and the second resources, same data over the first resources and the second resources.

In Aspect 2, the method of Aspect 1 includes where the one or more parameters include a first identifier of the first periodic resource grant and a second identifier of the second periodic resource grant.

In Aspect 3, the method of any of Aspects 1 or 2 includes where the one or more parameters relate to one or more rules for linking the periodic resource grant resources.

In Aspect 4, the method of Aspect 3 includes where the one or more parameters include a threshold time period from the first resources for which to link other periodic resource grant resources including the second resources.

In Aspect 5, the method of Aspect 4 includes where the threshold time period is a number of symbols in a same slot as the first resources.

In Aspect 6, the method of any of Aspects 1 to 5 includes where the configuration is received in a RRC signal.

In Aspect 7, the method of Aspect 6 includes where the configuration further includes a MAC-CE or DCI to activate or deactivate the linking.

In Aspect 8, the method of any of Aspects 1 to 7 includes where the second resources are greater than the first resources, and where transmitting or receiving the same data over the second resources includes mapping data from the first resources within the second resources over frequency followed by time.

In Aspect 9, the method of any of Aspects 1 to 8 includes where the second resources are greater than the first resources, and where transmitting or receiving the same data over the second resources includes mapping data from the first resources within the second resources over time followed by frequency.

In Aspect 10, the method of any of Aspects 1 to 9 includes where the second resources are less than the first resources, and where transmitting or receiving the same data over the second resources includes transmitting or receiving parity bits of the data from the first resources over the second resources.

In Aspect 11, the method of any of Aspects 1 to 10 includes where the first periodic resource grant includes a repetition value configured for transmitting or receiving repetitions over the first resources and additional resources indicated by the first periodic resource grant, and where transmitting or receiving the same data over the first resources and the second resources is based on a second repetition value for linking the periodic resource grant resources, where the second repetition value is different from the first repetition value.

In Aspect 12, the method of Aspect 11 includes where the configuration indicates the second repetition value.

In Aspect 13, the method of any of Aspects 1 to 12 includes where transmitting or receiving the same data over the first resources and second resources includes indicating or obtaining different redundancy versions in the first resources and the second resources.

In Aspect 14, the method of any of Aspects 1 to 13 includes monitoring feedback resources of the first resources to receive feedback for transmitting the same data over the first resources and the second resources.

In Aspect 15, the method of any of Aspects 1 to 14 includes receiving a third periodic resource grant indicating third resources, different from the first resources, for communicating in the wireless network, where transmitting or receiving the same data over the first resources and the second resources includes refraining from transmitting or receiving the same data over the third resources based on an indication to cancel communications over the third resources, or rate matching being performed over the third resources.

In Aspect 16, the method of any of Aspects 1 t0 15 includes where the first periodic resource grant and the second periodic resource grant are one of uplink configured grants or downlink semi-persistent scheduling grants.

Aspect 17 is a method for wireless communication at a network node including transmitting, for a UE, a configuration indicating one or more parameters for linking periodic resource grant resources for communication in a wireless network, transmitting a first periodic resource grant indicating first resources for communicating in the wireless network, transmitting a second periodic resource grant indicating second resources, different from the first resources, for communicating in the wireless network, and transmitting or receiving, based on the one or more parameters indicating to link the first resources and the second resources, same data over the first resources and the second resources.

In Aspect 18, the method of Aspect 17 includes where the one or more parameters include a first identifier of the first periodic resource grant and a second identifier of the second periodic resource grant.

In Aspect 19, the method of any of Aspects 17 or 18 includes where the one or more parameters relate to one or more rules for linking the periodic resource grant resources.

In Aspect 20, the method of Aspect 19 includes where the one or more parameters include a threshold time period from the first resources for which to link other periodic resource grant resources including the second resources.

In Aspect 21, the method of Aspect 20 includes where the threshold time period is a number of symbols in a same slot as the first resources.

In Aspect 22, the method of any of Aspects 17 to 21 includes where the configuration is transmitted in a RRC signal.

In Aspect 23, the method of Aspect 22 includes where the configuration further includes a MAC-CE or DCI to activate or deactivate the linking.

In Aspect 24, the method of any of Aspects 17 to 23 includes where the second resources are greater than the first resources, and where transmitting or receiving the same data over the second resources includes mapping data from the first resources within the second resources over frequency followed by time.

In Aspect 25, the method of any of Aspects 17 to 24 includes where the second resources are greater than the first resources, and where transmitting or receiving the same data over the second resources includes mapping data from the first resources within the second resources over time followed by frequency.

In Aspect 26, the method of any of Aspects 17 to 25 includes where the second resources are less than the first resources, and where transmitting or receiving the same data over the second resources includes transmitting or receiving parity bits of the data from the first resources over the second resources.

In Aspect 27, the method of any of Aspects 17 to 26 includes where the first periodic resource grant includes a repetition value configured for transmitting or receiving repetitions over the first resources and additional resources indicated by the first periodic resource grant, and where transmitting or receiving the same data over the first resources and the second resources is based on a second repetition value for linking the periodic resource grant resources, where the second repetition value is different from the first repetition value.

In Aspect 28, the method of Aspect 27 includes where the configuration indicates the second repetition value.

In Aspect 29, the method of any of Aspects 17 to 28 includes where transmitting or receiving the same data over the first resources and second resources includes indicating or obtaining different redundancy versions in the first resources and the second resources.

In Aspect 30, the method of any of Aspects 17 to 29 includes transmitting, over feedback resources related to the first resources, feedback for receiving the same data over the first resource and the second resources.

In Aspect 31, the method of any of Aspects 17 to 30 includes transmitting a third periodic resource grant indicating third resources, different from the first resources, for communicating in the wireless network, where transmitting or receiving the same data over the first resources and the second resources includes refraining from transmitting or receiving the same data over the third resources based on an indication to cancel communications over the third resources, or rate matching being performed over the third resources.

In Aspect 32, the method of any of Aspects 17 31 includes where the first periodic resource grant and the second periodic resource grant are one of uplink configured grants or downlink semi-persistent scheduling grants.

Aspect 33 is an apparatus for wireless communication including a processor, memory coupled with the processor, and instructions stored in the memory and operable, when executed by the processor, to cause the apparatus to perform any of the methods of Aspects 1 to 32.

Aspect 34 is an apparatus for wireless communication including means for performing any of the methods of Aspects 1 to 32.

Aspect 35 is a computer-readable medium including code executable by one or more processors for wireless communications, the code including code for performing any of the methods of Aspects 1 to 32.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a processor;
   memory coupled with the processor; and
   instructions stored in the memory and operable, when executed by the processor, to cause the apparatus to:
   receive, from a network node, a configuration indicating one or more parameters for linking periodic resource grant resources for communication in a wireless network;
   receive a first periodic resource grant indicating first resources for communicating in the wireless network;
   receive a second periodic resource grant indicating second resources, different from the first resources, for communicating in the wireless network; and
   transmit or receive, based on the one or more parameters indicating to link the first resources and the second resources, same data over the first resources and the second resources, wherein the one or more parameters include a threshold time period from the first resources for which to link other periodic resource grant resources including the second resources.

2. The apparatus of claim 1, wherein the one or more parameters include a first identifier of the first periodic resource grant and a second identifier of the second periodic resource grant.

3. The apparatus of claim 1, wherein the one or more parameters relate to one or more rules for linking the periodic resource grant resources.

4. The apparatus of claim 1, wherein the threshold time period is a number of symbols in a same slot as the first resources.

5. The apparatus of claim 1, wherein the configuration is received in a radio resource control (RRC) signal.

6. The apparatus of claim 5, wherein the configuration further includes a media access control-control element (MAC-CE) or downlink control information (DCI) to activate or deactivate the linking.

7. The apparatus of claim 1, wherein the second resources are at least a size of the first resources, and wherein the instructions, when executed by the processor, cause the apparatus to transmit or receive the same data over the second resources at least in part by mapping data from the first resources within the second resources over frequency followed by time.

8. The apparatus of claim 1, wherein the second resources are at least a size of the first resources, and wherein the instructions, when executed by the processor, cause the apparatus to transmit or receive the same data over the second resources at least in part by mapping data from the first resources within the second resources over time followed by frequency.

9. The apparatus of claim 1, wherein the second resources are less than the first resources, and wherein the instructions, when executed by the processor, cause the apparatus to transmit or receive the same data over the second resources at least in part by transmitting or receiving parity bits of the data from the first resources over the second resources.

10. The apparatus of claim 1, wherein the first periodic resource grant includes a repetition value configured for transmitting or receiving repetitions over the first resources and additional resources indicated by the first periodic resource grant, and wherein the instructions, when executed by the processor, cause the apparatus to transmit or receive the same data over the first resources and the second resources based on a second repetition value for linking the periodic resource grant resources, wherein the second repetition value is different from the first repetition value.

11. The apparatus of claim 10, wherein the configuration indicates the second repetition value.

12. The apparatus of claim 1, wherein the instructions, when executed by the processor, cause the apparatus to transmit or receive the same data over the first resources and second resources at least in part by indicating or obtaining different redundancy versions in the first resources and the second resources.

13. The apparatus of claim 1, wherein the instructions, when executed by the processor, cause the apparatus to monitor feedback resources of the first resources to receive feedback for transmitting the same data over the first resources and the second resources.

14. The apparatus of claim 1, wherein the instructions, when executed by the processor, cause the apparatus to receive a third periodic resource grant indicating third resources, different from the first resources, for communicating in the wireless network, wherein the instructions, when executed by the processor, cause the apparatus to transmit or receive the same data over the first resources and the second resources at least in part by refraining from transmitting or receiving the same data over the third resources based on an indication to cancel communications over the third resources, or rate matching being performed over the third resources.

15. The apparatus of claim 1, wherein the first periodic resource grant and the second periodic resource grant are one of uplink configured grants or downlink semi-persistent scheduling grants.

16. An apparatus for wireless communication, comprising:
   a processor;
   memory coupled with the processor; and
   instructions stored in the memory and operable, when executed by the processor, to cause the apparatus to:
   transmit, for a user equipment (UE), a configuration indicating one or more parameters for linking periodic resource grant resources for communication in a wireless network;

transmit a first periodic resource grant indicating first resources for communicating in the wireless network;

transmit a second periodic resource grant indicating second resources, different from the first resources, for communicating in the wireless network; and transmit or receive, based on the one or more parameters indicating to link the first resources and the second resources, same data over the first resources and the second resources, wherein the one or more parameters include a threshold time period from the first resources for which to link other periodic resource grant resources including the second resources.

17. The apparatus of claim 16, wherein the one or more parameters include a first identifier of the first periodic resource grant and a second identifier of the second periodic resource grant.

18. The apparatus of claim 16, wherein the one or more parameters relate to one or more rules for linking the periodic resource grant resources.

19. The apparatus of claim 18, wherein the threshold time period is a number of symbols in a same slot as the first resources.

20. The apparatus of claim 16, wherein the configuration is transmitted in a radio resource control (RRC) signal.

21. The apparatus of claim 20, wherein the configuration further includes a media access control-control element (MAC-CE) or downlink control information (DCI) to activate or deactivate the linking.

22. The apparatus of claim 16, wherein the second resources are at least a size of the first resources, and wherein the instructions, when executed by the processor, cause the apparatus to transmit or receive the same data over the second resources at least in part by at least one of:
    mapping data from the first resources within the second resources over frequency followed by time; or
    mapping data from the first resources within the second resources over time followed by frequency.

23. The apparatus of claim 16, wherein the second resources are less than the first resources, and wherein the instructions, when executed by the processor, cause the apparatus to transmit or receive the same data over the second resources at least in part by transmitting or receiving parity bits of the data from the first resources over the second resources.

24. The apparatus of claim 16, wherein the first periodic resource grant includes a repetition value configured for transmitting or receiving repetitions over the first resources and additional resources indicated by the first periodic resource grant, and wherein the instructions, when executed by the processor, cause the apparatus to transmit or receive the same data over the first resources and the second resources based on a second repetition value for linking the periodic resource grant resources, wherein the second repetition value is different from the first repetition value.

25. The apparatus of claim 16, wherein the instructions, when executed by the processor, cause the apparatus to transmit or receive the same data over the first resources and second resources at least in part by indicating or obtaining different redundancy versions in the first resources and the second resources.

26. The apparatus of claim 16, wherein the instructions, when executed by the processor, cause the apparatus to transmit, over feedback resources related to the first resources, feedback for receiving the same data over the first resource and the second resources.

27. A method for wireless communication at a user equipment (UE), comprising:
    receiving, from a network node, a configuration indicating one or more parameters for linking periodic resource grant resources for communication in a wireless network;
    receiving a first periodic resource grant indicating first resources for communicating in the wireless network;
    receiving a second periodic resource grant indicating second resources, different from the first resources, for communicating in the wireless network; and
    transmitting or receiving, based on the one or more parameters indicating to link the first resources and the second resources, same data over the first resources and the second resources, wherein the one or more parameters include a threshold time period from the first resources for which to link other periodic resource grant resources including the second resources.

28. The method of claim 27, wherein the one or more parameters include a first identifier of the first periodic resource grant and a second identifier of the second periodic resource grant.

29. A method for wireless communication at a network node, comprising:
    transmitting, for a user equipment (UE), a configuration indicating one or more parameters for linking periodic resource grant resources for communication in a wireless network;
    transmitting a first periodic resource grant indicating first resources for communicating in the wireless network;
    transmitting a second periodic resource grant indicating second resources, different from the first resources, for communicating in the wireless network; and
    transmitting or receiving, based on the one or more parameters indicating to link the first resources and the second resources, same data over the first resources and the second resources, wherein the one or more parameters include a threshold time period from the first resources for which to link other periodic resource grant resources including the second resources.

* * * * *